Patented Nov. 27, 1923.

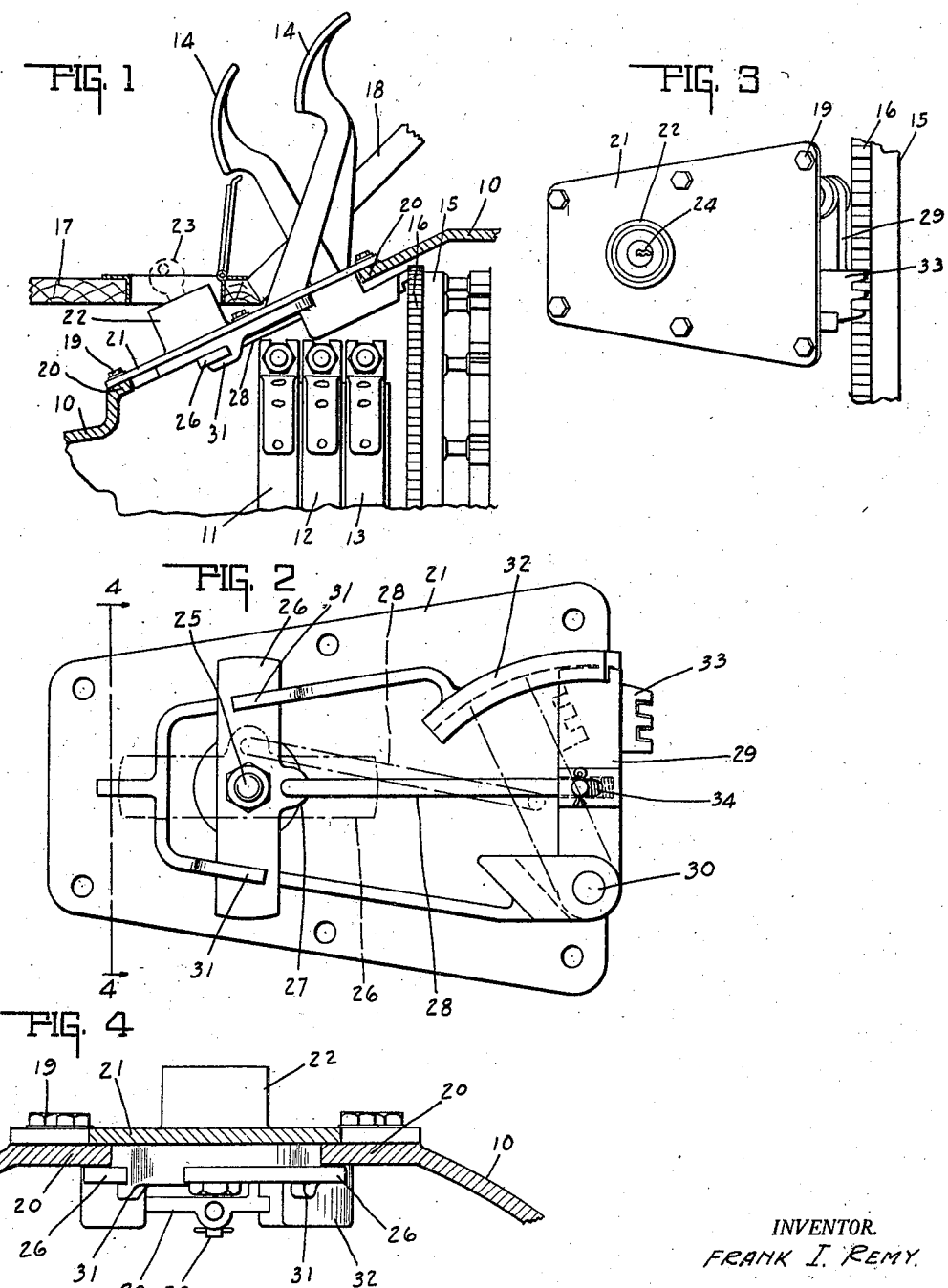

1,475,447

UNITED STATES PATENT OFFICE.

FRANK I. REMY, OF INDIANAPOLIS, INDIANA.

LOCKING DEVICE FOR MOTORS.

Application filed March 4, 1922. Serial No. 541,037.

*To all whom it may concern:*

Be it known that I, FRANK I. REMY, a citizen of the United States, and a resident of Indianapolis, county of Marion, and State of Indiana, have invented a certain new and useful Locking Device for Motors; and I do hereby declare that the following is a full, clear, and exact description thereof, reference being had to the accompanying drawings, in which like numerals refer to like parts.

This invention relates to a locking device for motor vehicles for locking the same against theft, and more particularly that type of lock adapted to engage and lock the motor against turning, whereby the motor of the vehicle cannot be operated by unauthorized persons.

One feature of the invention resides in the construction of the locking device, whereby the motor will be locked by the turning movement of the locking key. By means of this arrangement the key is so connected with the motor engaging teeth or bolt, that when turned to locking position the motor will be locked against movement and when turned to unlocking position the motor will be released so as to permit its operation.

Another feature of the invention resides in the arrangement and construction of the locking device, whereby it may be readily substituted for a part of the vehicle, thereby avoiding any change in parts or unnecessary additions to the original construction thereof. This is accomplished by arranging the locking device upon the transmission plate which may be substituted for the original transmission plate of the vehicle.

A further feature of the invention resides in the arrangement of the locking construction whereby when the mechanism is turned to locking position, not only the motor will be locked against rotation, but the supporting plate and mechanism will be locked to the vehicle so that it cannot be removed therefrom or tampered with.

Still a further feature resides in the arrangement of the engaging and locking teeth whereby they will automatically seek their proper engaging position with respect to the motor, and when in such position will be firmly wedged and locked therein upon any attempted movement of said motor.

Other features of the invention reside in the construction and arrangement of the parts will be hereinafter more specifically described and claimed.

The full nature of this invention will be understood from the accompanying drawings and the following description and claims.

In the drawings Fig. 1 is a central vertical section through the locking device showing it in locked position. Fig. 2 is a plan view of the end side of the supporting plate showing the mechanism in locking position in full lines and in unlocked position in dotted lines. Fig. 3 is a plan view looking down upon the construction showing its position with respect to the engine when in locking position. Fig. 4 is a section taken on the line 4—4 of Fig. 2 showing the supporting plate locked against removal.

In the drawings there is shown that portion of a vehicle having a transmission casing 10, and transmission bands 11, 12 and 13 operated and controlled by the pedals 14. Said transmission casing is secured upon the vehicle adjacent the motor fly wheel 15 mounted on the crank shaft of the motor not shown herein, said fly wheel being provided with the peripheral teeth 16 in position to be engaged by the starting motor not shown herein, in the usual manner. A portion of the floor board 17 is shown immediately above the transmission casing 10, and a portion of the foot board 18 is shown connected adjacent thereto. The construction shown and described herein is that which is well known as the standard construction of the Ford motor car.

The top plate of the transmission casing 10 is removed by removing the securing bolts 19 which are arranged to secure the original cover plate to the casing through the top flanges 20 which surround the opening therein, so that access may be had to the transmission. This invention contemplates providing a similar top plate 21 adapted to be substituted for the original plate and fit over the securing flanges 20 of the casing and be secured thereto by the bolts 19 in the same manner. The plate 21 is provided with an upwardly extending lock barrel 22 containing the usual tumbler lock operated by the key 23 adapted to extend through the opening 24. Said key operates to turn the downwardly extending pin 25 which is rigidly secured to a cross bar or bolt 26 mounted on the under side of said plate. The connection between the pin 25 and bolt 26 is such that said bolt will extend horizontally across the plate when in locking position and will be turned longitudinally thereof when in unlocking position, as shown by the dotted lines in Fig. 2. One side of said bolt is provided with an ear 27 formed integral therewith to which is pivotally connected the connecting rod 28, said rod extending longitudinally of the plate and being pivoted at its other end to a swinging bar 29 which is pivoted at one end to the plate at the point 30, this arrangement being such that as the bolt 26 is turned to locking position the bar 29 will be parallel therewith and in locking position, as shown in full lines in Fig. 2, whereas when the bolt 26 is turned in unlocking position said bar will be drawn back out of locking engagement as shown in dotted lines in Fig. 2.

Secured to the under side of said plate there are positioned bolt receiving jaws 31 into which the bolt 26 slides when turned to locking position for limiting its movement in that direction and holding it firmly against the under side of the side flanges 20 of the casing, as shown in Fig. 4. This prevents the removal of the plate 21 from the casing when the device is locked, although the securing bolts 19 may be removed in the usual manner. There is also provided an arcuate guide 32 in which the end of the bar slides when swinging about its pivot point into and out of locking position. The plate is further locked to the casing by the position of the bar 29, when in locking position, by reason of its extension under the end flange portion 20 of said casing, as shown in Fig. 1.

The bar 29 is provided with a plurality of engaging teeth 33 positioned on the opposite end from the pivot point 30 and so arranged as to slidably engage and mesh with the gear teeth of the fly wheel for preventing rotary movement thereof and consequently of the motor. The teeth 33 are so shaped that they may be readily engaged or disengaged from the gear teeth, but will become more firmly wedged therein for preventing movement upon attempt to turn the fly wheel. If upon the stopping of the motor, the gear teeth of the fly wheel are not in proper position for the locking teeth 33 to mesh, when the lock is actuated by turning the key 23, said locking teeth will be moved into enagement with the sides of the gear teeth but not mesh therewith. By reason of the cushion spring 34 positioned between the end of the rod 28 and the end of the receiving socket of the bar 29, the lock may be completely actuated without said teeth meshing. In this position said locking teeth are forced against the sides of the gear teeth under the pressure of the spring 34 and will remain in this position until an attempt is made to turn the motor or fly wheel without unlocking the device. Upon the slight rotary movement of the fly wheel the teeth thereon will be brought into engagement with the locking teeth 33, which will immediately mesh therewith by reason of the spring 34. Therefore, the motor will be completely locked against further movement until the locking teeth are withdrawn from the gear teeth by turning the key 23.

The invention claimed is:

1. In a lock for a motor driven vehicle, the combination with a driving motor having a fly wheel thereon provided with peripheral teeth, and a removable part on said vehicle, of a plate adapted to be substituted for said removable part and secured to said vehicle, a locking mechanism, a key actuated locking pin, a cross bar rigidly secured on said pin so as to be turned by said key, a locking member pivoted to said plate in position to engage and lock said fly wheel against rotation, a connecting rod joining said cross bar and locking member, and means engageable by said cross bar when said member is moved to locking position for locking said plate on said vehicle.

2. In a lock for a motor driven vehicle, the combination with a driving motor having a fly wheel thereon provided with peripheral teeth, and a removable part on said vehicle, of a plate adapted to be substituted for said removable part and secured to said vehicle, a locking mechanism, a key actuated locking pin, a cross bar rigidly secured on said pin so as to be turned by said key, a locking member pivoted to said plate in position to engage and lock said fly wheel against rotation, a connecting rod joining said cross bar and locking member, means engageable by said cross bar when said member is moved to locking position for locking said plate on said vehicle, and oppositely extending receiving jaws positioned on said plate for receiving said cross bar when in locking position for strengthening its connection with said plate.

3. In a lock for a motor driven vehicle, the combination with a driving motor having a fly wheel thereon provided with peripheral teeth, a transmission casing associated therewith having a removable plate, of a plate adapted to be substituted for said removable plate and secured to said casing, a locking mechanism, a locking pin, a key for actuating said pin, a cross bar rigidly secured to said pin so as to be turned by said key, a locking member pivoted to said plate in position to engage and lock said fly wheel against rotation, and a connecting rod joining said cross bar and locking member for causing said fly wheel to be locked when said cross bar is turned to locking position, said cross bar being adapted to extend transversely of said plate so that the ends thereof engage with the sides of said casing, whereby said plate will be rigidly locked thereon.

4. In a lock for a motor driven vehicle, the combination with a driving motor having a fly wheel thereon provided with peripheral teeth, a transmission casing associated with said fly wheel and having a removable plate thereon, of a plate adapted to be substituted for said removable plate and removably secured to said casing, means on said last mentioned plate for engaging and locking said fly wheel against rotation, a key actuated cross bar pivotally mounted thereon and connected with said locking means so as to extend transversely of said plate when said means is in locking position, whereby the ends thereof will engage the sides of said casing for locking said plate against removal therefrom, and a pair of oppositely extending receiving jaws rigidly secured to said plate for receiving said bar when in locking position and strengthening its locking engagement with said casing.

In witness whereof, I have hereunto affixed my signature.

FRANK I. REMY.